Figure 1:
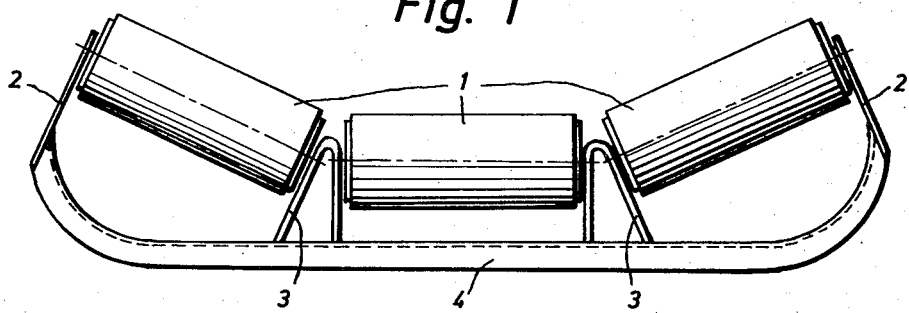

United States Patent [19]

Brunes

[11] 3,797,082
[45] Mar. 19, 1974

[54] SUPPORTING ROLLER FOR BELT AND ROLLER CONVEYORS

[76] Inventor: Tons Jean Brunes, Attemosevej 8, 2840 Holte, Denmark

[22] Filed: June 23, 1972

[21] Appl. No.: 265,702

[30] Foreign Application Priority Data
June 29, 1971 Denmark............................ 3198/71

[52] U.S. Cl............................................. 29/116 R
[51] Int. Cl.............................................. B21b 13/02
[58] Field of Search........ 29/116 R, 125, 130, 129.5

[56] References Cited
UNITED STATES PATENTS

| | | | |
|---|---|---|---|
| 2,218,817 | 10/1940 | Frost.................................. | 29/125 X |
| 2,270,436 | 1/1942 | Hart................................... | 29/116 R |
| 2,528,116 | 10/1950 | Clemson ........................ | 29/116 R X |
| 2,626,422 | 1/1953 | Lammertse .................... | 29/125 UX |
| 2,817,940 | 12/1957 | Lorig................................ | 29/116 R X |
| 3,513,519 | 5/1970 | Savela................................... | 29/125 |

FOREIGN PATENTS OR APPLICATIONS
203,839    10/1956    Australia.............................. 29/125

Primary Examiner—Alfred R. Guest
Attorney, Agent, or Firm—Walter Becker

[57] ABSTRACT

A supporting roller for belt and roller conveyors which comprises a cylindrical body mounted on a shaft having smooth running bearings which are arranged at each end of the shaft and are placed against a shoulder or similar stop arrangement. The supporting roller includes a plurality of substantially identical cylinder elements of plastic or similar material, and two uniform end discs with a bearing back stop and with a mantle of rubber or rubber-like material covering the cylinder elements. These cylinder elements and the end discs are held together by clamping devices.

3 Claims, 3 Drawing Figures

PATENTED MAR 19 1974　　　　　　　　　　　　3,797,082

SUPPORTING ROLLER FOR BELT AND ROLLER CONVEYORS

The present invention relates to a supporting roller for belt conveyors or roller conveyors consisting of a cylindrical body mounted on a shaft at each end of which smooth-running bearings are placed against a flange or similar stopper.

In the case of belt conveyors where an endless resilient conveyor belt is led over several supporting brackets arranged in a line and placed at suitable intervals with such supporting rollers, the individual supporting bracket may according to field of application either be provided with one horizontal supporting roller or with several supporting rollers arranged in open V- or U-shape.

In the case of roller conveyors, which normally are used for the transport of flat objects having a plane bottom surface, the supporting rollers are mounted along profiles skirting the conveyor and placed relatively close against each other according to the size of the transported goods.

Belt conveyors of the kind mentioned are often used to transport bulk goods such as earth, gravel or stone, which, to a large extent, takes place in the open. As the conveyor belts running over the rollers and carried by these are very expensive indeed, it is of great importance in order to prevent too much wear and tear that the supporting rollers are strong and that they above all run smoothly on bearings which are well protected against both moisture and dust. These requirements make it necessary that the supporting rollers usually consist of seamless iron tubes which, by means of a double-walled platebushing and a ball bearing at each end, are rotatably mounted on a through-going steel shaft, the outer wall of the bushing closely fitting the inner side of the iron tube, while the inner wall of the bushing partly tightly encloses the race of the ball bearing and partly, outside the bearing, is provided with a labyrinth seal.

This design makes it possible to use relatively thin-walled iron tubes and slim shafts, even for supporting rollers with diameters of the sizes 90 to 150 mm external diameter. But even supporting rollers thus designed have a substantial weight in relation to the amount of material that can be transported on a conveyor belt running thereon. For instance, in the case of belt conveyors intended for transport of 50 kilos material per meter conveyor belt, the weight of supporting brackets per meter belt may easily amount to 30 kilos.

Besides the weight disadvantage the above design has, furthermore, the serious disadvantage that the conveyor belt, if a supporting roller in such a belt conveyor for some reason or other should stick, will wear out the iron tube, whereby, when once the iron tube is worn all the way through, some very sharp worn edges appear which cut into and may completely ruin the conveyor belt which, as mentioned, is very costly. Furthermore, there is the disadvantage regarding hitherto known supporting rollers of this kind that for each roller-diameter, supporting rollers of various lengths varying from 100 – 200 mm or more according to requirement have to be made.

It is the object of the invention to establish a supporting roller for the mentioned uses which eliminates the above-stated disadvantages, and at the same time is not more expensive to produce than hitherto known supporting rollers. This is achieved, according to the invention, by the supporting roller being built of a plurality of identical cylinder elements made of plastic or similar material, two uniform end discs against bearing back-stop and a mantle of natural rubber or other rubberlike material covering the cylinder elements, said elements and end discs being held together by clamping devices.

Such a supporting roller presents a substantial advantage as regards weight for the belt conveyors as a whole, and it can easily be assembled in arbitrary lengths with varying axial lengths of the individual cylinder elements. This is a great advantage when building belt conveyors or roller conveyors of different widths or form, as the stock keeping becomes very simple. The advantage is especially obvious regarding roller conveyors having branches and switch tongues, where the width of the conveyor in front of the branches progressively increases. However, the most substantial advantage is that the supporting roller used in the roller conveyor does not present any danger of damage to the conveyor belt at standstill, as no sharp-edged wearing-faces will appear on account of the developed frictional heat, which may melt the material.

The cylinder elements may, according to the invention, have a cylindrical outer wall and an inner wall placed coaxially to same, said inner wall being connected to the outer wall by radial walls with channels made therein, which channels run axially, and furthermore the elements between the radial walls have from the end edges axially protruding parts engaging between the radial walls of the neighbouring element.

By this it is achieved that the supporting roller gets a satisfactory radial strength in its entire length, and that the projecting parts make the assembling of the elements easier, as they serve as guiding members for flushing of the channels intended for the clamping devices. The projecting parts, furthermore, prevent a twisting of the elements in relation to each other.

The end discs have, according to the invention, on one side a portion corresponding to the outer wall of the cylinder elements, and on the other side two concentrically situated, ring-shaped projections, the outer cylindrical parts of which abut against the interior surface of the outer wall and the inner wall of the cylinder elements, as the outer projections of the end discs have intervals corresponding to the radial walls, while the inner projection has an end surface abutting against the bearing race, and, furthermore, the end discs have holes partly for the shaft, partly for the clamping devices through the channels in the radial walls of the cylinder elements.

By this design of the end discs an effective bearing back-stop and a centering of the cylinder elements are achieved. Both the end discs and the elements can without difficulty be produced using a corrosion-resistant plastic of low weight. Thus, the supporting roller weighs less, so that, as mentioned, a considerable advantage as regards weight can be obtained when building belt conveyors or roller conveyors with supporting rollers according to the invention.

The invention is further explained in the following by means of an embodiment with reference to the drawing, in which FIG. 1 shows a supporting bracket for a belt conveyor with supporting rollers according to the invention, FIG. 2 a supporting roller partly exposed and partly in section, and FIG. 3 one of the cylinder elements of the supporting roller entered in FIG. 2, seen from the end and in axial section.

In FIG. 1 is shown a supporting bracket with three supporting rollers 1, of which the one is horizontally situated and the two are inclined so that they form an open U-shape. The shafts of the supporting rollers are embedded in stands 2 and 3, which are fixed to a base frame 4. Across the rollers 1 a flexible conveyor belt — not shown — runs, which,with the shown placing of the supporting rollers, forms a trough-shaped chute.

Figure 2:
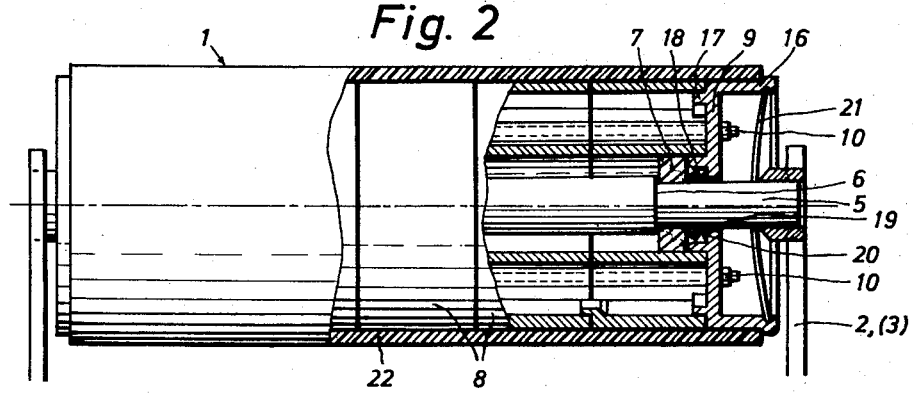

The construction of the supporting roller 1 according to the invention is illustrated in FIG. 2. The supporting roller 1 consists of a shaft 5 which at both ends is provided with a shoulder 6 against which lies a ball bearing 7. The shaft 5 is embedded in stands 2 or 3, being fixed to the base frame of the supporting bracket. According to the invention the supporting roller consists of several identical cylinder elements 8 and two end discs, and it is all held together by through-going bolts 10.

Figure 3:
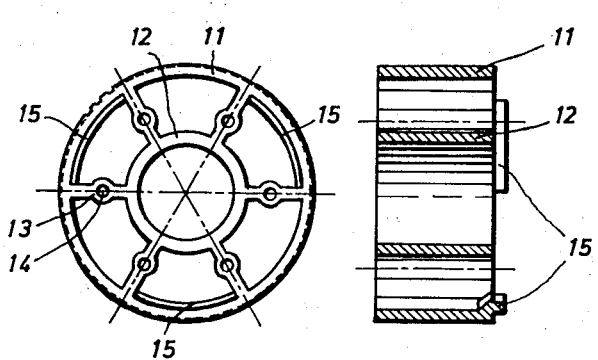

The individual cylinder elements 8 shown in FIG. 3 have a cylindrical outer wall 11, an inner wall 12 situated coaxially to same, and running between these walls radial walls 13, of which there are six in the present case. The radial walls are designed with axial apertures 14 for receiving the assembling bolts 10. The cylinder element 8 has, furthermore, extending from the one end, axial projections 15 stretching between the radial walls along the outer wall 11. These projections 15 are intended for guiding the elements 8 when assembling, so that the apertures 14 come to lie opposite each other, engaging between the radial walls 13 on the neighbouring element. The form of the projections is not limited to the one shown on the drawing, but may have any suitable design, for instance the projections 15 may run along the outer side of the inner wall 12. If the projections 15 are placed as shown in FIG. 3,however, consideration must be taken when designing these that the elements also can be combined with the projections 15 against each other, for instance by only placing the projections 15 in every second space between the radial walls, as shown. This precaution is necessary, because the two outer elements 8 at both ends of the assembled supporting roller must be without projection 15 on account of the placing of the end discs 9. This condition must therefore be considered when placing the projections 15.

The number of the radial walls 13 may in itself be arbitrary as long as their function as to strength is fulfilled.

The end discs 9 have to the one side a cylindrical part 16, see FIG. 2, the diameter of which corresponds to the outer wall 11 of the cylinder elements. To the other side the end discs have two concentric, annular projections 17 and 18. The outer projection 17 has an outer cylindrical part, the diameter of which equals the inside diameter of the outer wall 11 of the elements. This projection has, furthermore, intervals corresponding to the radial walls of the elements. The inner projection 18 must also be designed with a cylindrical outer part, the diameter of which equals the inner diameter of the inner wall 12, but the projection 18 must, furthermore, be designed with a bearing back-stop against the race on the ball bearing 7. The end disc has, furthermore, a hole 19 for the passage of the shaft as well as holes for the clamping bolts 10. On the shaft 5 between the bearing 7 and the end disc 9 a labyrinth seal 20 is placed, and at the outermost point of the shaft 5 a cover plate 21 is placed which is secured, for instance, in an annular groove inwardly in the cylindrical part 16 of the end disc 9.

For protection against wear and permeation by moisture and dust between the individual elements 8, the supporting roller 1 is provided with a rubber mantle 22 which covers all elements and projects beyond the cylindrical part 16 of the end disc, which part may possibly have a stop flange, as shown. On account of the fixing of the rubber mantle 22, for instance by gluing, the elements 8 along the whole circumference have axially running grooves in the outer wall 11.

In the case of the supporting roller according to the invention it will be easy to produce supporting rollers of various axial lengths by just combining more or fewer elements, and a supporting roller already assembled can also easily be prolonged or shortened as only shaft, clamping bolts and rubber mantle have to be changed, while elements for the new length are put on or taken off.

What I claim is:

1. A supporting roller assembly for conveyors selectively of belt and roller type including a cylindrical body mounted on a shaft journalled by smooth-running bearing means having shoulder support, comprising a plurality of cylinder elements of plastic material and the like, each cylinder element having a cylindrical outer wall and an inner wall located coaxially therewith,radial wall means interconnecting said inner and outer walls and having axially extending apertures therein, a resilient mantle provided for covering said cylinder elements, projecting parts extending from end edge locations of said cylinder elements and engaging between radial walls of an adjoining cylinder element, two uniform end discs with a bearing back-stop, and clamping means holding said end discs and said cylinder elements together.

2. A supporting roller assembly according to claim 1 in which a cylindrical portion of said end discs on one side thereof corresponds to said outer wall of said cylinder elements, two concentrically-situated circular projections on another side of said end discs that abut against interior surfacing of said outer wall and said inner wall of said cylinder elements, and including an outermost one of said two projections having intervals corresponding to said radial walls, an innermost one of said two projections having an end surface abutting against outer location of the bearing means, said end discs having holes partly for the shaft and partly for said clamping means extending through the passages in said radial walls of said cylinder elements.

3. A supporting roller assembly according to claim 1 wherein means forming axially extending grooves are provided upon entire exterior surfacing of said outer wall of said cylinder elements.

* * * * *